(12) United States Patent
Raghavan et al.

(10) Patent No.: US 12,119,895 B2
(45) Date of Patent: Oct. 15, 2024

(54) METHODS AND APPARATUS FOR MULTI-TRP UL TRANSMISSION

(71) Applicant: APPLE INC., Cupertino, CA (US)

(72) Inventors: Manasa Raghavan, Cupertino, CA (US); Dawei Zhang, Cupertino, CA (US); Haitong Sun, Cupertino, CA (US); Huaning Niu, Cupertino, CA (US); Jie Cui, Cupertino, CA (US); Qiming Li, Beijing (CN); Rohit U. Nabar, Cupertino, CA (US); Xiang Chen, Cupertino, CA (US); Yakun Sun, Cupertino, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 432 days.

(21) Appl. No.: 17/593,248

(22) PCT Filed: Mar. 31, 2021

(86) PCT No.: PCT/CN2021/084682
§ 371 (c)(1),
(2) Date: Sep. 14, 2021

(87) PCT Pub. No.: WO2022/205177
PCT Pub. Date: Oct. 6, 2022

(65) Prior Publication Data
US 2023/0208475 A1    Jun. 29, 2023

(51) Int. Cl.
*H04B 7/0404* (2017.01)
*H04B 17/318* (2015.01)
(Continued)

(52) U.S. Cl.
CPC ......... *H04B 7/0404* (2013.01); *H04B 17/318* (2015.01); *H04B 17/336* (2015.01); *H04W 72/21* (2023.01)

(58) Field of Classification Search
CPC .. H04B 7/0404; H04B 17/318; H04B 17/336; H04B 72/21
See application file for complete search history.

(56) References Cited

U.S. PATENT DOCUMENTS 10,893,431 B2 *   1/2021   Liou ..................... H04W 16/28
11,211,990 B2 *  12/2021   Yi ......................... H04L 5/0053
(Continued)

FOREIGN PATENT DOCUMENTS

CN      109314562 A      2/2019
CN      109792610 A      5/2019
(Continued)

OTHER PUBLICATIONS

Huawei, Hisilicon , "Enhancements on multi-TRP for reliability and robustness in Rel-17", R1-2007587, 3GPP TSG RAN WG1 Meeting #103-e, E-meeting, Agenda Item 8.1.2.1, Oct. 26-Nov. 13, 2020, 12 pages.

(Continued)

*Primary Examiner* — Jay P Patel
(74) *Attorney, Agent, or Firm* — Dorsey & Whitney LLP (57) ABSTRACT

Methods and apparatus provide for a wireless network to enable multiple-transmission reception point (multi-TRP) uplink (UL) time division multiplexed (TDMed) repetition transmission. The network may receive, from a user equipment (UE), beam measurements of downlink reference signals associated with a plurality of UL transmission beams from the UE to the multi-TRP. Based on criteria associated with the beam measurements received from the UE, the network enables the UE for the multi-TRP UL TDMed (Continued)

repetition transmission using the plurality of UL transmission beams. In addition, or in other scenarios, coordination is provided between the network and the UE to improve UL TDMed repetition transmissions when a UE switches between antenna panels.

17 Claims, 9 Drawing Sheets

(51) Int. Cl.
*H04B 17/336* (2015.01)
*H04W 72/21* (2023.01)

(56) References Cited

U.S. PATENT DOCUMENTS

| | | | | |
|---|---|---|---|---|
| 11,375,393 | B2* | 6/2022 | Liou | H04W 76/19 |
| 11,399,385 | B2* | 7/2022 | Huang | H04L 5/0044 |
| 2020/0029237 | A1* | 1/2020 | Kim | H04W 24/10 |
| 2021/0083751 | A1* | 3/2021 | Chen | H04W 24/10 |
| 2021/0297959 | A1* | 9/2021 | Zhou | H04W 52/42 |
| 2021/0337420 | A1* | 10/2021 | Lo | G06F 9/5083 |
| 2021/0337469 | A1* | 10/2021 | Zhou | H04W 72/23 |
| 2021/0351833 | A1* | 11/2021 | Sakhnini | H04B 7/0641 |
| 2021/0360460 | A1* | 11/2021 | Taherzadeh Boroujeni | H04B 7/0645 |
| 2021/0360462 | A1* | 11/2021 | Taherzadeh Boroujeni | H04W 24/08 |
| 2022/0070899 | A1* | 3/2022 | Huang | H04L 5/0007 |
| 2022/0095145 | A1* | 3/2022 | Sakhnini | H04L 5/0023 |
| 2022/0104036 | A1* | 3/2022 | Zhou | H04W 24/04 |
| 2022/0109489 | A1* | 4/2022 | Zhu | H04W 80/02 |
| 2022/0110109 | A1* | 4/2022 | Tsai | H04W 72/27 |
| 2022/0116801 | A1* | 4/2022 | Dallal | H04W 24/08 |
| 2022/0201695 | A1* | 6/2022 | Landis | H04B 7/063 |
| 2022/0330301 | A1* | 10/2022 | Huang | H04W 72/1273 |
| 2022/0361007 | A1* | 11/2022 | Cui | H04B 7/088 |
| 2022/0369123 | A1* | 11/2022 | Zhang | H04B 17/336 |
| 2023/0041095 | A1* | 2/2023 | Zhou | H04L 5/0057 |
| 2023/0047603 | A1* | 2/2023 | Kim | H04L 5/0051 |
| 2023/0112271 | A1* | 4/2023 | Kim | H04L 5/0053 370/329 |
| 2023/0198602 | A1* | 6/2023 | Zeineddine | H04W 76/19 370/329 |

FOREIGN PATENT DOCUMENTS

| | | |
|---|---|---|
| CN | 111108795 A | 5/2020 |
| WO | 2020232155 A1 | 11/2020 |

OTHER PUBLICATIONS

PCT/CN2021/084682, International Search Report and Written Opinion, Dec. 2, 2021, 10 pages.

* cited by examiner

METHODS AND APPARATUS FOR MULTI-TRP UL TRANSMISSION

TECHNICAL FIELD

This application relates generally to wireless communication systems, including uplink transmissions to multiple transmission reception points (multi-TRPs).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a wireless network and is configured with the hardware, software, and/or firmware to exchange information and data with the wireless network. Therefore, the UE as described herein is used to represent any appropriate electronic component.

To improve reliability, certain systems with further enhanced multiple-input-multiple-output (FeMIMO) may include enhancements to physical downlink control channel (PDCCH), physical uplink control channel (PUCCH), and physical uplink shared channel (PUSCH) with multiple transmission reception point (multi-TRP) transmission. One of the potential enhancements is PUCCH and/or PUSCH repetition with different transmit (TX) beams. Embodiments disclosed herein provide enhancements to support repetition based multi-TRP uplink (UL) transmission. Certain embodiments, for example, define criteria to enable UL repetition transmission with multiple beams. In addition, or in other embodiments, coordination is provided between a wireless network and a UE to improve UL time division multiplexed (TDMed) transmissions when a UE switches between antenna panels.

Figure 1A:
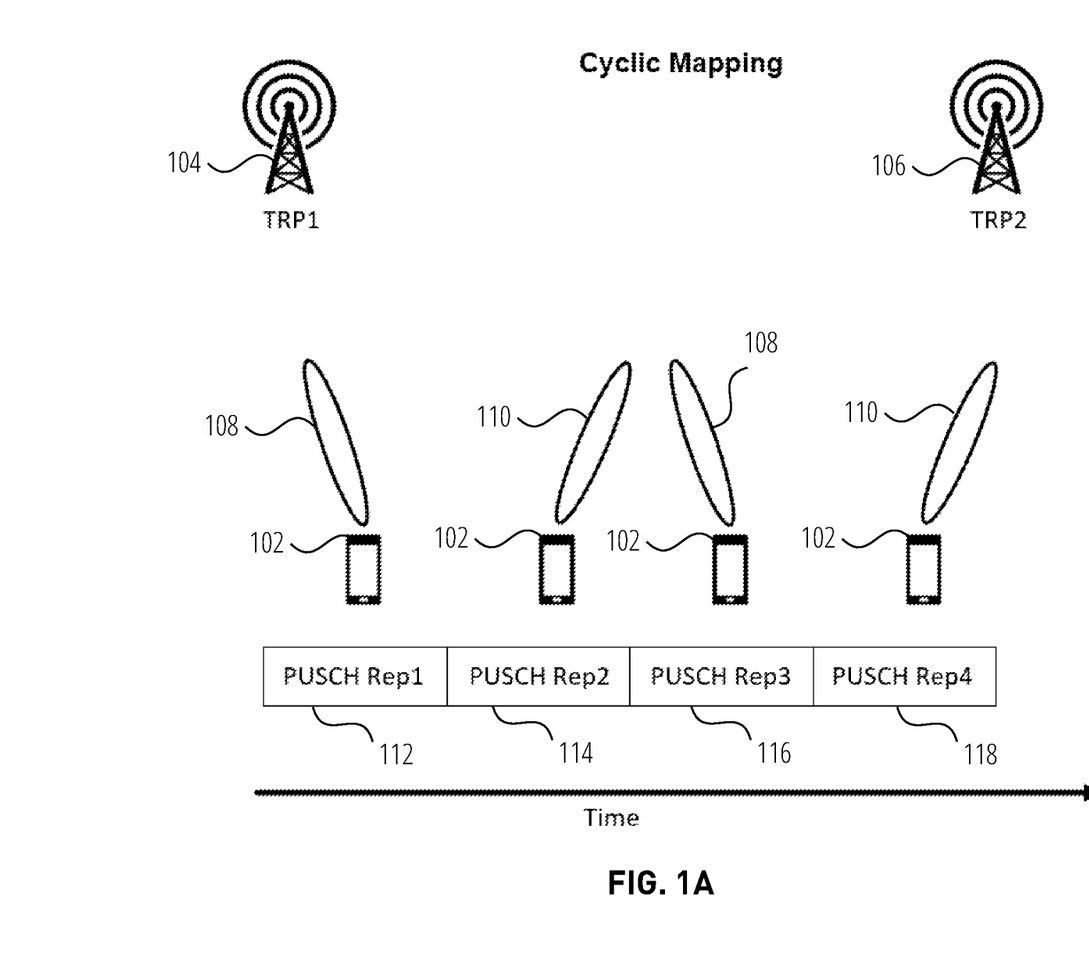
FIG. 1A and FIG. 1B are block diagrams illustrating examples of multi-TRP UL TDMed repetition transmission in accordance with one embodiment.
Figure 1B:
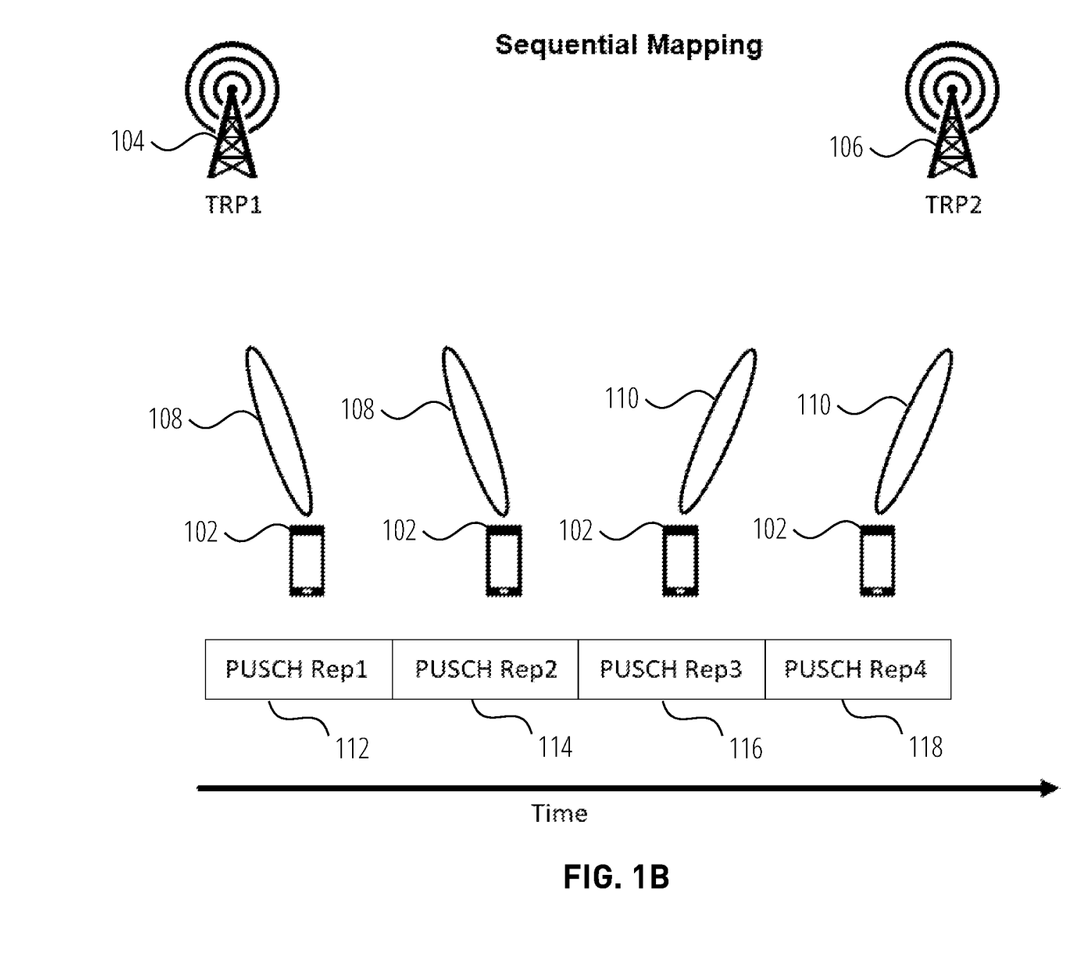

FIG. 1A and FIG. 1B are block diagrams illustrating examples of multi-TRP UL TDMed repetition transmission according to certain embodiments. In the illustrated examples, a UE 102 is shown at different points in time as it repeats a PUSCH transmission to a first TRP 104 (shown as TRP1) and a second TRP 106 (shown as TRP2). Although this example shows a PUSCH, a PUCCH could also be used.

FIG. 1A illustrates a cyclic mapping where the UE 102 cycles back and forth between transmitting the PUSCH to the first TRP 104 and the second TRP 106. At a first point in time, the UE 102 uses a first TX beam 108 for a first transmission 112 of the PUSCH (shown as PUSCH Rep1) to the first TRP 104. At a second point in time, the UE 102 uses a second TX beam 110 for a second transmission 114 of the PUSCH (shown as PUSCH Rep 2) to the second TRP 106. At a third point in time, the UE 102 uses the first TX beam 108 for a third transmission 116 of the PUSCH (shown as PUSCH Rep3) to the first TRP 104. At a fourth point in time, the UE 102 uses the second TX beam 110 for a fourth transmission 118 of the PUSCH (shown as PUSCH Rep4) to the second TRP 106.

FIG. 1B illustrates a sequential mapping where the UE 102 transmits multiple repetitions of the PUSCH to the first TRP 104 before transmitting one or more repetitions of the PUSCH to the second TRP 106. As shown in FIG. 1B, at a first point in time, the UE 102 uses a first TX beam 108 for a first transmission 112 of the PUSCH (shown as PUSCH Rep1) to the first TRP 104. At a second point in time, the UE 102 uses the first TX beam 108 for a second transmission 114 of the PUSCH (shown as PUSCH Rep 2) to the first TRP 104. At a third point in time, the UE 102 uses a second TX beam 110 for a third transmission 116 of the PUSCH (shown as PUSCH Rep3) to the second TRP 106. At a fourth point in time, the UE 102 uses the second TX beam 110 for a fourth transmission 118 of the PUSCH (shown as PUSCH Rep4) to the second TRP 106.

Regardless of the scheme used (e.g., cyclic mapping or sequential mapping), multi-TRP UL TDMed transmission with repetition is introduced to enhance reliability. A wireless network may configure a UE in a connected state to perform measurements and report the measurement results according to a measurement configuration. The measurement configuration may be provided by dedicated signaling. The measurement configuration may define, for example, measurement objects, reporting configurations, measurement gaps, and other parameters. For each measurement type (e.g., intra-frequency, inter-frequency, and inter-RAT), the measurement configuration may define one or more measurement object (MO). In NR, each MO may indicate frequency, timing, and subcarrier spacing of reference signals to be measured. When configured by the wireless network, the UE may be able to perform Layer 1 reference signal received power (L1-RSRP) and/or Layer 1 signal-to-noise and interference ratio (L1-SINR) measurements of downlink (DL) reference signals, such as a synchronization signal blocks (SSB), a channel state information reference signal (CSI-RS), or both. Skilled persons will recognize from the disclosure herein that Layer 1 refers to the physical (PHY) layer of the protocol stack.

Figure 2:
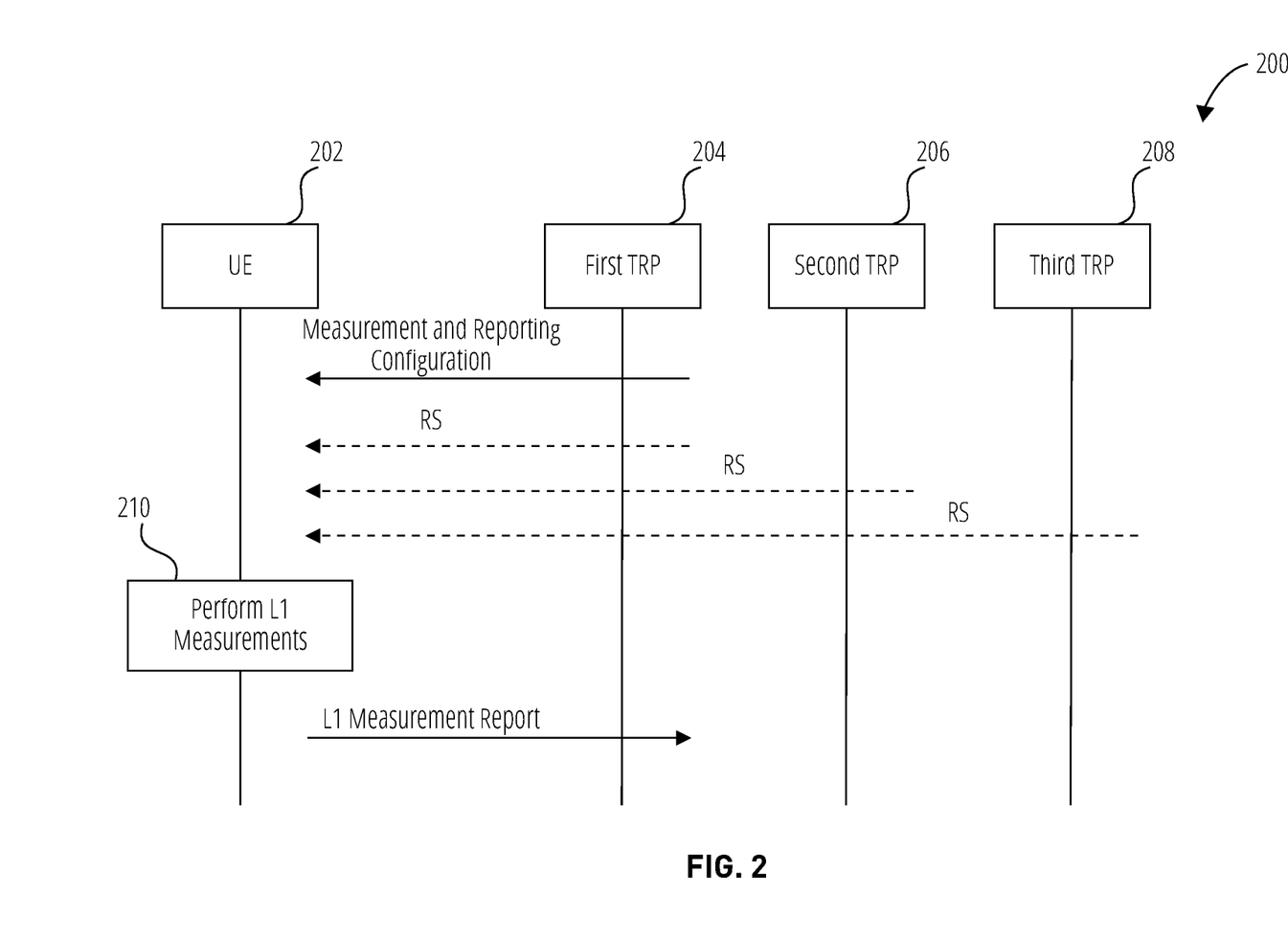
FIG. 2 is a diagram illustrating example L1 measurement and reporting that may be used with certain embodiments.

For example, FIG. 2 is a diagram illustrating example L1 measurement and reporting 200 that may be used with certain embodiments. In this example, a UE 202 receives a measurement and reporting configuration from a first TRP 204. The measurement and reporting configuration configures the UE 202 to perform L1 measurements 210 on one or more DL reference signal (RS) received from the first TRP 204 and one or more neighbor cells (shown in this example as second TRP 206 and third TRP 208). If reporting conditions indicated in the measurement and reporting configuration are satisfied, the UE 202 generates and sends an L1 measurement report to the first TRP 204. Generally, a UE may send L1 measurement reports (e.g., L1-RSRP, L1-SINR) for report configurations configured by the wireless network. The UE may use periodic reporting, semi-persistent reporting, or aperiodic reporting.

Measuring the DL RSs provides channel condition or beam condition information that may be associated with corresponding UL transmission beams from the UE to the different TRPs. The wireless network may use the reported L1-RSRP and/or L1-SINR to enable multi-TRP UL TDMed transmission, as shown in FIG. 1A or FIG. 1B. However, it is currently not defined when or how the wireless network determines to use the TDMed UL repetition transmission scheme. Thus, certain embodiments herein define criteria to enable UL repetition transmission with multiple beams. The criteria may include, for example, beam measurement based criteria, L1-RSRP/L1-SINR based criteria, and/or time based criteria.

For the beam measurement based criteria, according to one embodiment, the wireless network enables UL repetition transmission with multiple beams when the UL beams are known to the UE. The UE monitors, measures, and reports L1-RSRP and/or L1-SINR for the DL RSs associated with UL transmission beams to multi-TRP. Based on the measurement reports from the UE, the wireless network may determine that the UL beams are known to the UE. Based on this information, the wireless network may enable the UE to use the known UL beams for multi-TRP UL TDMed transmission. In certain such embodiments, the wireless network determines that the reported beam information is not outdated before enabling the multi-TRP UL TDMed transmission scheme. For example, the UE may determine that the beam measurements and reporting were made within a last X milliseconds (ms).

For the L1-RSRP/L1-SINR based criteria, according to one embodiment, the wireless network enables UL repetition transmission with multiple beams when an absolute L1-RSRP and/or L1-SINR measured value is below a predetermined threshold that warrants the repetitions so as to provide reliability enhancement of the UL transmissions. In other words, if the beam quality is such that the L1-RSRP and/or L1-SINR measured value is above the predetermined threshold, the wireless network may determine that a UL transmission does not need to be repeated to multi-TRP to enhance reliability. In addition, in certain embodiments, the wireless network determines that the L1-RSRP and/or L1-SINR measured values for the DL RSs associated with the different UL beams are comparable to one another in order for the repetition scheme to be successful. The wireless network may, for example, enable UL repetition transmission with multiple beams when a difference (i.e., delta) between the L1-RSRP and/or L1-SINR of the DL RSs associated with the different UL beams is within a range of 0 to Y dB.

For the time based criteria, the wireless network may enable UL repetition transmission with multiple beams when a total number of repetitions for a PUCCH or PUSCH is within a certain time such that the UE TX beams do not become outdated (e.g., due to movement or rotation of the UE). For example, if the number of repetitions extend over sixteen slots then wireless network may determine that the UL beams may become outdated before the repetitions can be transmitted. Thus, in certain embodiments, the wireless network enables UL repetition transmission with multiple beams when the repetitions are within a certain time such that the conditions (e.g., channel conditions, L1-RSRP/L1-SINR measurements) do not substantially change.

Figure 3:
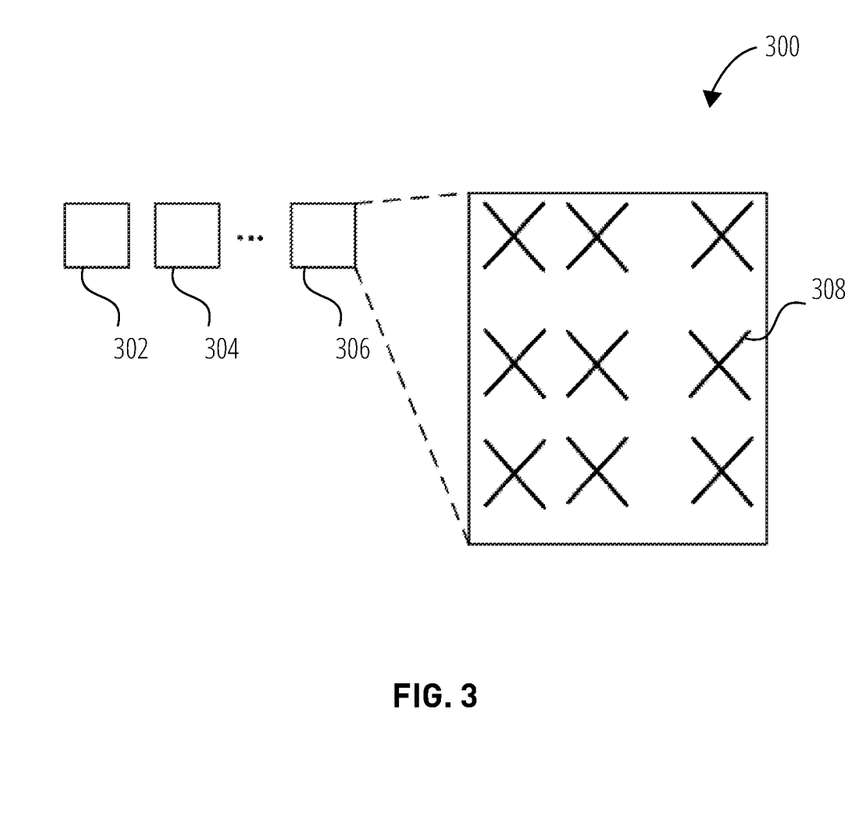
FIG. 3 illustrates an antenna array that may be used in a UE for wireless communications in accordance with one embodiment.

FIG. 3 illustrates an antenna array 300 that may be used in a UE for wireless communications according to certain embodiments. The antenna array 300 may include two or more antenna panels. In this example, an antenna panel 302, an antenna panel 304, and an antenna panel 306 are shown. Although shown in an array, the antenna panels may be arranged in other configurations in the UE. For example, two antenna panels may be placed at opposite sides of the UE. Each antenna panel may include a plurality of antenna elements 308 (e.g., dual-polarized antennas).

During a UL beam switch, the UE might switch between beams within the same panel or a different panel. In case of intra-panel beam switching, the switching time may be within a cyclic prefix (CP) length. However, in case of inter-panel beam switching, the switching time may be longer than the CP, if both panels are not already activated. When both antenna panels are not activated, additional panel activation time needs to be considered for beam switching. The UE might choose to de-activate antenna panels, for example, when not in use to reduce power consumption. Panel activation and/or de-activation may cause additional interruption on other active component carriers (CCs).

If the wireless network is unaware of the antenna panel(s) used for reception of the DL RSs and transmission of the UL beams, then the wireless network is unaware of whether additional time is used by the UE for beam switching due to switching between different antenna panels.

Thus, in one embodiment, the UE provides an indication of the antenna panel along with the corresponding L1-RSRP and/or L1-SINR measurement. The indication enables the wireless network to determine the switching time needed for UL TDMed transmissions based on the antenna panel indicated for the corresponding measurements. The wireless network may also account for resource allocation based on transmission gaps to accommodate UE beam switching.

In another embodiment, the UE dynamically indicates a time for beam switching for a scheduled UL transmission with repetition based on DL RSs associated with the UL beams. The wireless network may allocate resources and switching gap according to the UE indication.

In another embodiment, a short activation period is used during which both panels involved in switching from a first beam to a second beam are activated. Thus, the UE can switch UL beams without a long delay. In certain such embodiments, the activation period contains all repetitions and is limited in time to avoid extra UE power consumption. Using the short activation period helps avoid long gaps for beam switching and interruptions due to activation and/or de-activation of the antenna panels. The UE may indicate, based on its capability of multi-panel support, whether the UE supports or can benefit from a short period where both antenna panels involved in the beam switch are active. The wireless network may then schedule the active period for UE and schedules the UL TDMed repetition transmissions.

In certain embodiments, the wireless network schedules repetition based UL transmission with a long enough time (e.g., K2) between a PDCCH scheduling a PUSCH and an actual transmission of the PUSCH from the UE, such that the UE can activate antenna panels and prepare for UL transmission without large gaps between transmissions. When combined with embodiments using the short activation period discussed above, K2 is selected so as to be long enough for the UE to prepare for UL transmission without the need for extra time and/or gaps for antenna panel activation.

Figure 4:
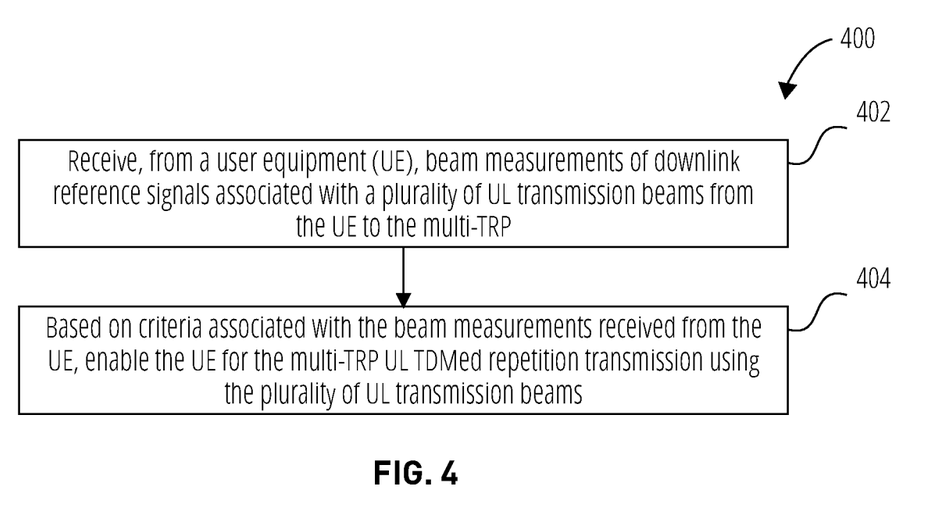
FIG. 4 is a flowchart of a method for a wireless network to enable multi-TRP UL TDMed repetition transmission in accordance with one embodiment.

FIG. 4 is a flowchart of a method 400 for a wireless network to enable multiple-transmission reception point (multi-TRP) uplink (UL) time division multiplexed (TDMed) repetition transmission according to certain embodiments. In block 402, the method 400 includes receiving, from a user equipment (UE), beam measurements of downlink reference signals associated with a plurality of UL transmission beams from the UE to the multi-TRP. In block 404, the method 400 includes enabling, based on criteria associated with the beam measurements received from the UE, the UE for the multi-TRP UL TDMed repetition transmission using the plurality of UL transmission beams.

In certain embodiments of the method 400, the criteria comprises beam measurement based criteria associated with the plurality of UL transmission beams being known to the UE based on the beam measurements received from the UE. The method 400 may further include determining that the beam measurement based criteria are satisfied when the beam measurements received from the UE comprise at least one of Layer 1 reference signal received power (L1-RSRP) measurements and Layer 1 signal-to-noise and interference ratio (L1-SINR) measurements for the downlink reference signals associated with the plurality of UL transmission beams from the UE to the multi-TRP. The method 400 may further include determining that the beam measurement based criteria are satisfied when the plurality of UL transmission beams are known to the UE based on the at least one of the L1-RSRP measurements and the L1-SINR measurements being made and reported within a predetermined time period.

In addition or in other embodiments of the method 400, the criteria comprises a Layer 1 reference signal received power (L1-RSRP) or a Layer 1 signal-to-noise and interference ratio (L1-SINR) based criteria. The method 400 may further include determining that the L1-RSRP or the L1-SINR based criteria are satisfied when an absolute value for an L1-RSRP measurement or an L1-SINR measurement is below a predetermined threshold. The method 400 may further include determining that the L1-RSRP or L1-SINR based criteria are satisfied when a difference between the L1-RSRP measurement or the L1-SINR measurement for respective ones of the downlink reference signals associated with the plurality of UL transmission beams from the UE to the multi-TRP is within a predetermined range.

In addition or in other embodiments of the method 400, the criteria comprises a time based criteria. The method 400 may further include determining that the time based criteria are satisfied when a total number of repetitions for a physical uplink control channel (PUCCH) or a physical uplink shared channel (PUSCH) are within a predetermined time period. The method 400 may further include selecting the predetermined time period based on at least one of: the plurality of UL transmission beams are not outdated during the predetermined time period due to movement or rotation of the UE; and Layer 1 reference signal received power (L1-RSRP) measurements or Layer 1 signal-to-noise and interference ratio (L1-SINR) measurements for the downlink reference signals do not change more than a predetermined amount during the predetermined time period.

In certain embodiments of the method 400, the beam measurements received from the UE include indications of a corresponding antenna panel used by the UE for measuring respective ones of the downlink reference signals associated with the plurality of UL transmission beams. The method 400 may further include determining, based on the indications of the corresponding antenna panel, a switching time for the UE to switch between the plurality of UL transmission beams to perform the multi-TRP UL TDMed repetition transmission. The method 400 may further include allocating UL resources to the UE based on transmission gaps to accommodate the UE switching between the plurality of UL transmission beams.

In certain embodiments, the method 400 further includes: receiving, from the UE, an indication of a time for beam switching for a scheduled UL transmission with repetition based on the downlink reference signals associated with the plurality of UL transmission beams; and based on the indication of the time for beam switching, allocating UL resources and a switching gap for switching between antenna panels at the UE.

In certain embodiments, the method 400 further includes: receiving, from the UE, an indication that the UE supports using a period of time during which two or more antenna panels at the UE are active; and in response to the indication scheduling an active period during which the UE activates the two or more antenna panels, and scheduling the plurality of UL transmission beams for transmission based on the active period. The method 400 may further include scheduling the plurality of UL transmission beams for transmission based on a timing difference between a physical downlink control channel (PDCCH) scheduling a physical uplink shared channel (PUSCH) and an actual transmission of the PUSCH from the UE, wherein the time difference is large enough to allow the UE to activate an inactive antenna panel for UL transmission.

Embodiments contemplated herein include an apparatus comprising means to perform one or more elements of the method 400. This apparatus may be, for example, an apparatus of a UE 600 as described below.

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, the memory 606 of the UE 600 described below, and/or the peripheral devices 804, the memory/storage devices 814, and/or the databases 820 of the components 800 as described below.

Embodiments contemplated herein include an apparatus comprising logic, modules, or circuitry to perform one or more elements of the method 400. This apparatus may be, for example, an apparatus of a UE 600 as described below.

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE 400 as described below.

Figure 5:
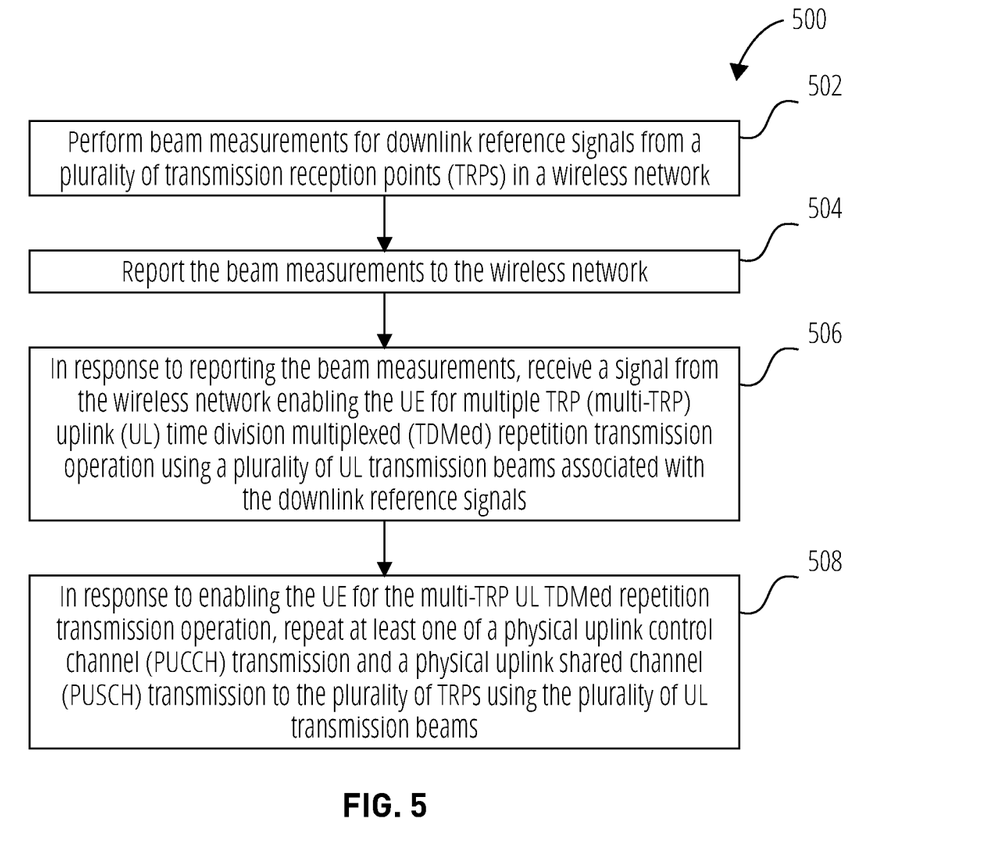
FIG. 5 is a flowchart of a method for a UE in accordance with one embodiment.

FIG. 5 is a flowchart of a method 500 for a user equipment (UE) according to certain embodiments. In block 502, the method 500 includes performing beam measurements for downlink reference signals from a plurality of transmission reception points (TRPs) in a wireless network. In block 504, the method 500 includes reporting the beam measurements to the wireless network. In block 506, in response to reporting the beam measurements, the method 500 includes receiving a signal from the wireless network enabling the UE for multiple TRP (multi-TRP) uplink (UL) time division multiplexed (TDMed) repetition transmission operation using a plurality of UL transmission beams associated with the downlink reference signals. In block 508, in response to enabling the UE for the multi-TRP UL TDMed repetition transmission operation, the method 500 includes repeating at least one of a physical uplink control channel (PUCCH) transmission and a physical uplink shared channel (PUSCH) transmission to the plurality of TRPs using the plurality of UL transmission beams.

In certain embodiments of the method 500, the beam measurements comprise at least one of Layer 1 reference signal received power (L1-RSRP) measurements and Layer 1 signal-to-noise and interference ratio (L1-SINR) measurements for the downlink reference signals.

In certain embodiments of the method 500, the UE includes a plurality of antenna panels. The method 500 may further include: sending, to the wireless network, an indication with the beam measurements to indicate a corresponding antenna panel of the plurality of antenna panels used by the UE for measuring respective ones of the downlink reference signals associated with the plurality of UL transmission beams; and processing UL resource allocations, from the wireless network, including UL transmission gaps for the UE to switch between the plurality of antenna panels during the multi-TRP UL TDMed repetition transmission operation.

In certain embodiments of the method 500, the UE includes a plurality of antenna panels. The method 500 may further include: dynamically indicating, to the wireless network, a time for beam switching for a scheduled UL transmission with repetition based on the downlink reference signals associated with the plurality of UL transmission beams; and processing UL resource allocations, from the wireless network, including UL transmission gaps for the UE to switch between the plurality of antenna panels during the multi-TRP UL TDMed repetition transmission operation.

In certain embodiments of the method 500, the UE includes a plurality of antenna panels. The method 500 may further include: indicating, to the wireless network, that the UE supports using a period of time during which two or more antenna panels at the UE are active; receiving, from the wireless network, an indication of an active period during which the UE is to activate the two or more antenna panels; and processing UL resource allocations, from the wireless network, for the UE to switch between the plurality of antenna panels during the active period.

Embodiments contemplated herein include an apparatus comprising means to perform one or more elements of the method 500. This apparatus may be, for example, an apparatus of a network node 700 as described below.

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, the memory 706 of the network node 700 described below, and/or the peripheral devices 804, the memory/storage devices 814, and/or the databases 820 of the components 800 as described below.

Embodiments contemplated herein include an apparatus comprising logic, modules, or circuitry to perform one or more elements of the method 500. This apparatus may be, for example, an apparatus of a network node 700 as described below.

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a network node 700 as described below.

Figure 6:
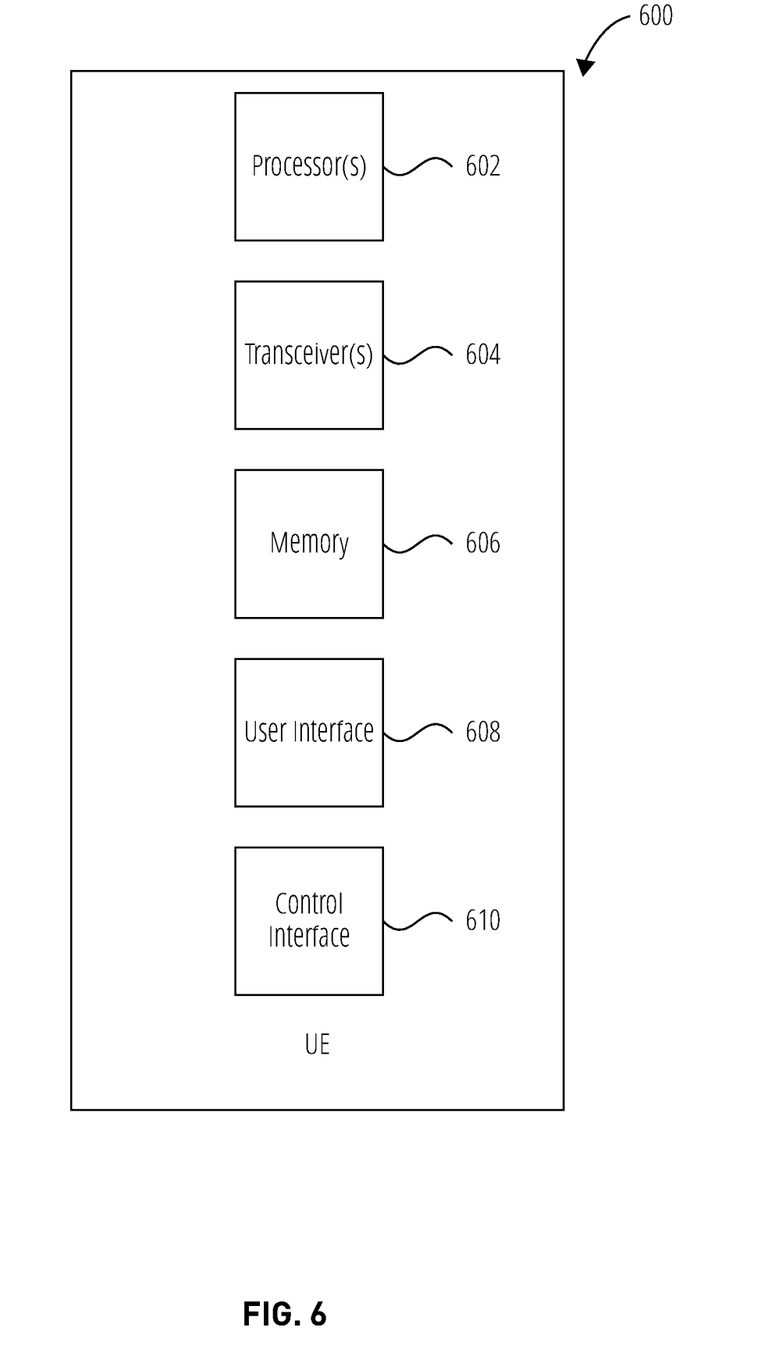
FIG. 6 illustrates a UE in accordance with one embodiment.

FIG. 6 is a block diagram of an example UE 600 configurable according to various embodiments of the present disclosure, including by execution of instructions on a computer-readable medium that correspond to any of the example methods and/or procedures described herein. The UE 600 comprises one or more processor 602, transceiver 604, memory 606, user interface 608, and control interface 610.

The one or more processor 602 may include, for example, an application processor, an audio digital signal processor, a central processing unit, and/or one or more baseband processors. Each of the one or more processor 602 may include internal memory and/or may include interface(s) to communication with external memory (including the memory 606). The internal or external memory can store software code, programs, and/or instructions for execution by the one or more processor 602 to configure and/or facilitate the UE 600 to perform various operations, including operations described herein. For example, execution of the instructions can configure the UE 600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 604, user interface 608, and/or control interface 610. As another example, the one or more processor 602 may execute program code stored in the memory 606 or other memory that corresponds to MAC, RLC, PDCP, and RRC layer protocols standardized by 3GPP (e.g., for NR and/or LTE). As a further example, the processor 602 may execute program code stored in the memory 606 or other memory that, together with the one or more transceiver 604, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 606 may comprise memory area for the one or more processor 602 to store variables used in protocols, configuration, control, and other functions of the UE 600, including operations corresponding to, or comprising, any of the example methods and/or procedures described herein. Moreover, the memory 606 may comprise non-volatile memory (e.g., flash memory), volatile memory (e.g., static or dynamic RAM), or a combination thereof. Furthermore, the memory 606 may interface with a memory slot by which removable memory cards in one or more formats (e.g., SD Card, Memory Stick, Compact Flash, etc.) can be inserted and removed.

The one or more transceiver 604 may include radio-frequency transmitter and/or receiver circuitry that facilitates the UE 600 to communicate with other equipment supporting like wireless communication standards and/or protocols. For example, the one or more transceiver 604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 602. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 604 includes a transmitter and a receiver that enable the UE 600 to communicate with various 5G/NR networks according to various protocols and/or methods proposed for standardization by 3 GPP and/or other standards bodies. For example, such functionality can operate cooperatively with the one or more processor 602 to implement a PHY layer based on OFDM, OFDMA, and/or SC-FDMA technologies, such as described herein with respect to other figures.

The user interface 608 may take various forms depending on particular embodiments, or can be absent from the UE 600. In some embodiments, the user interface 608 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 600 may comprise a tablet computing device including a larger touchscreen display. In such embodiments, one or more of the mechanical features of the user interface 608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 600 having a touch screen display are capable of receiving user inputs, such as inputs related to exemplary methods and/or procedures described herein or otherwise known to persons of ordinary skill in the art.

In some exemplary embodiments of the present disclosure, the UE 600 may include an orientation sensor, which can be used in various ways by features and functions of the UE 600. For example, the UE 600 can use outputs of the orientation sensor to determine when a user has changed the physical orientation of the UE 600's touch screen display. An indication signal from the orientation sensor can be available to any application program executing on the UE 600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 610 may take various forms depending on particular embodiments. For example, the control interface 610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 610 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 600 may include more functionality than is shown in FIG. 6 including, for example, a video and/or still-image camera, microphone, media player and/or recorder, etc. Moreover, the one or more transceiver 604 may include circuitry for communication using additional radio-frequency communication standards including Bluetooth, GPS, and/or others. Moreover, the one or more processor 602 may execute software code stored in the memory 606 to control such additional functionality. For example, directional velocity and/or position estimates output from a GPS receiver can be available to any application program executing on the UE 600, including various exemplary methods and/or computer-readable media according to various exemplary embodiments of the present disclosure.

Figure 7:
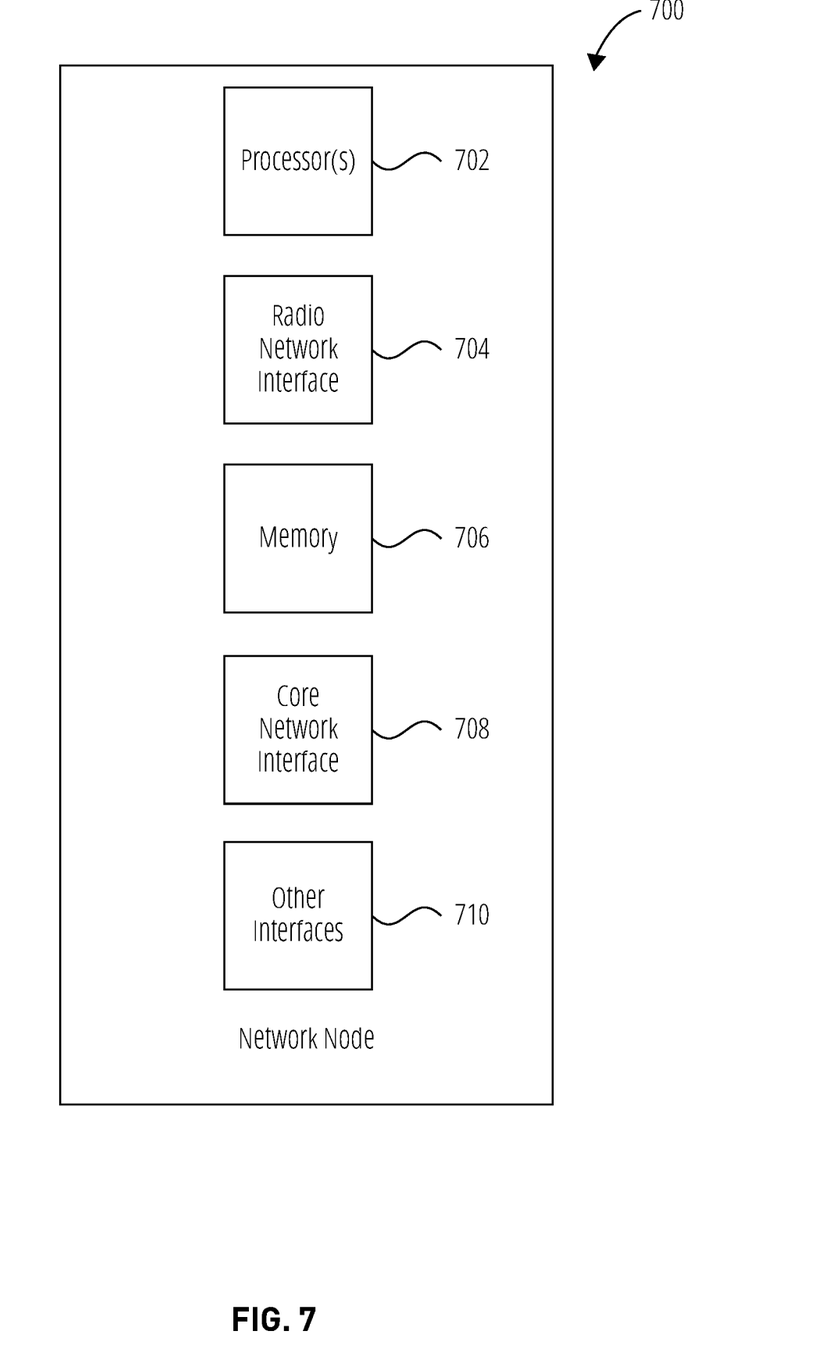
FIG. 7 illustrates a network node in accordance with one embodiment.

FIG. 7 is a block diagram of an example network node 700 configurable according to various embodiments of the present disclosure, including by execution of instructions on a computer-readable medium that correspond to any of the example methods and/or procedures described herein.

The network node 700 includes a one or more processor 702, a radio network interface 704, a memory 706, a core network interface 708, and other interfaces 710. The network node 700 may comprise, for example, a base station, eNB, gNB, access node, or component thereof.

The one or more processor 702 may include any type of processor or processing circuitry and may be configured to perform an of the methods or procedures disclosed herein. The memory 706 may store software code, programs, and/or instructions executed by the one or more processor 702 to configure the network node 700 to perform various operations, including operations described herein. For example, execution of such stored instructions can configure the network node 700 to communicate with one or more other devices using protocols according to various embodiments of the present disclosure, including one or more methods and/or procedures discussed above. Furthermore, execution of such stored instructions can also configure and/or facilitate the network node 700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 704 and the core network interface 708. By way of example and without limitation, the core network interface 708 comprise an S1 interface and the radio network interface 704 may comprise a Uu interface, as standardized by 3GPP. The memory 706 may also store variables used in protocols, configuration, control, and other functions of the network node 700. As such, the memory 706 may comprise non-volatile memory (e.g., flash memory, hard disk, etc.), volatile memory (e.g., static or dynamic RAM), network-based (e.g., "cloud") storage, or a combination thereof.

The radio network interface 704 may include transmitters, receivers, signal processors, ASICs, antennas, beamforming units, and other circuitry that enables network node 700 to communicate with other equipment such as, in some embodiments, a plurality of compatible user equipment (UE). In some embodiments, the network node 700 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 704 may include a PHY layer based on OFDM, OFDMA, and/or SC-FDMA technologies. In some embodiments, the functionality of such a PHY layer can be provided cooperatively by the radio network interface 704 and the one or more processor 702.

The core network interface 708 may include transmitters, receivers, and other circuitry that enables the network node 700 to communicate with other equipment in a core network such as, in some embodiments, circuit-switched (CS) and/or packet-switched Core (PS) networks. In some embodiments, the core network interface 708 may include the S1 interface standardized by 3GPP. In some embodiments, the core network interface 708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 710 may include transmitters, receivers, and other circuitry that enables the network node 700 to communicate with external networks, computers, databases, and the like for purposes of operations, administration, and maintenance of the network node 700 or other network equipment operably connected thereto.

Figure 8:
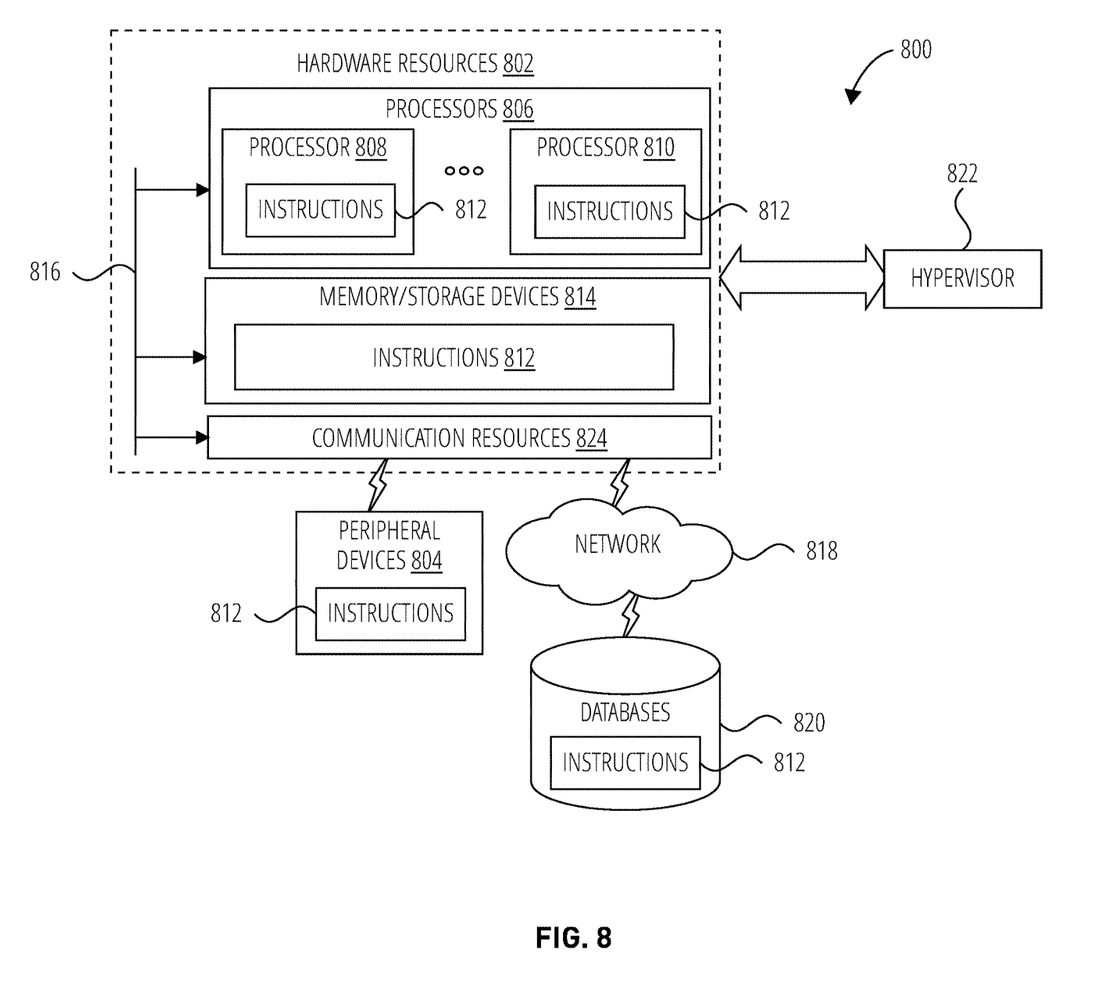
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 806 (or processor cores), one or more memory/storage devices 814, and one or more communication resources 824, each of which may be communicatively coupled via a bus 816. For embodiments where node virtualization (e.g., NFV) is utilized, a hypervisor 822 may be executed to provide an execution environment for one or more network slices/sub-slices to utilize the hardware resources 802.

The processors 806 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 808 and a processor 810.

The memory/storage devices 814 may include main memory, disk storage, or any suitable combination thereof. The memory/storage devices 814 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 824 may include interconnection or network interface components or other suitable devices to communicate with one or more peripheral devices 804 or one or more databases 820 via a network 818. For example, the communication resources 824 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 812 may comprise software, a program, an application, an applet, an app, or other executable code for causing at least any of the processors 806 to perform any one or more of the methodologies discussed herein. The instructions 812 may reside, completely or partially, within at least one of the processors 806 (e.g., within the processor's cache memory), the memory/storage devices 814, or any suitable combination thereof. Furthermore, any portion of the instructions 812 may be transferred to the hardware resources 802 from any combination of the peripheral devices 804 or the databases 820. Accordingly, the memory of the processors 806, the memory/storage devices 814, the peripheral devices 804, and the databases 820 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 may include an apparatus comprising means to perform one or more elements of any method or process described herein.

Example 2 may include one or more non-transitory computer-readable media comprising instructions to cause an electronic device, upon execution of the instructions by one or more processors of the electronic device, to perform one or more elements of any method or process described herein.

Example 3 may include an apparatus comprising logic, modules, or circuitry to perform one or more elements of any method or process described herein.

Example 4 may include an apparatus comprising: one or more processors and one or more computer-readable media comprising instructions that, when executed by the one or more processors, cause the one or more processors to perform the method, techniques, or process as described in or related to any embodiments, or portions thereof, described herein.

Example 5 may include a signal as described in or related to embodiments, or portions thereof, described herein.

Example 6 may include a datagram, packet, frame, segment, protocol data unit (PDU), or message as described in or related to any embodiments, or portions thereof, described herein.

Example 7 may include a signal in a wireless network as shown and described herein.

Example 8 may include a method of communicating in a wireless network as shown and described herein.

Example 9 may include a system for providing wireless communication as shown and described herein.

Example 10 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a wireless network to enable multiple-transmission reception point (multi-TRP) uplink (UL) time division multiplexed (TDMed) repetition transmission, the method comprising:
   receiving, from a user equipment (UE), beam measurements of downlink reference signals associated with a plurality of UL transmission beams from the UE to the multi-TRP; and
   based on criteria associated with the beam measurements received from the UE, enabling the UE for the multi-TRP UL TDMed repetition transmission using the plurality of UL transmission beams, wherein the criteria comprises a time based criteria, the method further comprising determining that the time based criteria are satisfied when a total number of repetitions for a physical uplink control channel (PUCCH) or a physical uplink shared channel (PUSCH) are within a predetermined time period.

2. The method of claim 1, wherein the criteria comprises beam measurement based criteria associated with the plurality of UL transmission beams being known to the UE based on the beam measurements received from the UE.

3. The method of claim 2, further comprising determining that the beam measurement based criteria are satisfied when the beam measurements received from the UE comprise at least one of Layer 1 reference signal received power (L1-RSRP) measurements and Layer 1 signal-to-noise and interference ratio (L1-SINR) measurements for the downlink reference signals associated with the plurality of UL transmission beams from the UE to the multi-TRP.

4. The method of claim 3, further comprising determining that the beam measurement based criteria are satisfied when the plurality of UL transmission beams are known to the UE based on the at least one of the L1-RSRP measurements and the L1-SINR measurements being made and reported within a predetermined time period.

5. The method of claim 1, wherein the criteria comprises a Layer 1 reference signal received power (L1-RSRP) or a Layer 1 signal-to-noise and interference ratio (L1-SINR) based criteria, the method further comprising determining that the L1-RSRP or the L1-SINR based criteria are satisfied when an absolute value for an L1-RSRP measurement or an L1-SINR measurement is below a predetermined threshold.

6. The method of claim 5, further comprising determining that the L1-RSRP or L1-SINR based criteria are satisfied when a difference between the L1-RSRP measurement or the L1-SINR measurement for respective ones of the downlink reference signals associated with the plurality of UL transmission beams from the UE to the multi-TRP is within a predetermined range.

7. The method of claim 1, further comprising selecting the predetermined time period based on at least one of:
the plurality of UL transmission beams are not outdated during the predetermined time period due to movement or rotation of the UE; and
Layer 1 reference signal received power (L1-RSRP) measurements or Layer 1 signal-to-noise and interference ratio (L1-SINR) measurements for the downlink reference signals do not change more than a predetermined amount during the predetermined time period.

8. The method of claim 1, wherein the beam measurements received from the UE include indications of a corresponding antenna panel used by the UE for measuring respective ones of the downlink reference signals associated with the plurality of UL transmission beams, the method further comprising determining, based on the indications of the corresponding antenna panel, a switching time for the UE to switch between the plurality of UL transmission beams to perform the multi-TRP UL TDMed repetition transmission.

9. The method of claim 8, further comprising allocating UL resources to the UE based on transmission gaps to accommodate the UE switching between the plurality of UL transmission beams.

10. The method of claim 1, further comprising:
receiving, from the UE, an indication of a time for beam switching for a scheduled UL transmission with repetition based on the downlink reference signals associated with the plurality of UL transmission beams; and
based on the indication of the time for beam switching, allocating UL resources and a switching gap for switching between antenna panels at the UE.

11. The method of claim 1, further comprising:
receiving, from the UE, an indication that the UE supports using a period of time during which two or more antenna panels at the UE are active; and
in response to the indication:
scheduling an active period during which the UE activates the two or more antenna panels; and
scheduling the plurality of UL transmission beams for transmission based on the active period.

12. The method of claim 11, further comprising scheduling the plurality of UL transmission beams for transmission based on a timing difference between a physical downlink control channel (PDCCH) scheduling the PUSCH and an actual transmission of the PUSCH from the UE, wherein the time difference is large enough to allow the UE to activate an inactive antenna panel for UL transmission.

13. A method for a user equipment (UE), the method comprising:
performing beam measurements for downlink reference signals from a plurality of transmission reception points (TRPs) in a wireless network;
reporting the beam measurements to the wireless network;
in response to reporting the beam measurements, receiving a signal from the wireless network enabling the UE for multiple TRP (multi-TRP) uplink (UL) time division multiplexed (TDMed) repetition transmission operation using a plurality of UL transmission beams associated with the downlink reference signals, wherein the signal enabling the UE for the multi-TRP UL TDMed repetition transmission operation comprises an indication of a determination, at the wireless network, that time based criteria associated with the beam measurements are satisfied when a total number of repetitions for a physical uplink control channel (PUCCH) or a physical uplink shared channel (PUSCH) are within a predetermined time period; and
in response to enabling the UE for the multi-TRP UL TDMed repetition transmission operation, repeating at least one of a transmission and a PUSCH transmission to the plurality of TRPs using the plurality of UL transmission beams.

14. The method of claim 13, wherein the beam measurements comprise at least one of Layer 1 reference signal received power (L1-RSRP) measurements and Layer 1 signal-to-noise and interference ratio (L1-SINR) measurements for the downlink reference signals.

15. The method of claim 13, wherein the UE includes a plurality of antenna panels, the method further comprising:
sending, to the wireless network, an indication with the beam measurements to indicate a corresponding antenna panel of the plurality of antenna panels used by the UE for measuring respective ones of the downlink reference signals associated with the plurality of UL transmission beams; and
processing UL resource allocations, from the wireless network, including UL transmission gaps for the UE to switch between the plurality of antenna panels during the multi-TRP UL TDMed repetition transmission operation.

16. The method of claim 13, wherein the UE includes a plurality of antenna panels, the method further comprising:
dynamically indicating, to the wireless network, a time for beam switching for a scheduled UL transmission with repetition based on the downlink reference signals associated with the plurality of UL transmission beams; and
processing UL resource allocations, from the wireless network, including UL transmission gaps for the UE to switch between the plurality of antenna panels during the multi-TRP UL TDMed repetition transmission operation.

17. The method of claim 13, wherein the UE includes a plurality of antenna panels, the method further comprising:
indicating, to the wireless network, that the UE supports using a period of time during which two or more antenna panels at the UE are active;
receiving, from the wireless network, an indication of an active period during which the UE is to activate the two or more antenna panels; and
processing UL resource allocations, from the wireless network, for the UE to switch between the plurality of antenna panels during the active period.

* * * * *